US009214247B2

(12) United States Patent
Shiraishi et al.

(10) Patent No.: US 9,214,247 B2
(45) Date of Patent: Dec. 15, 2015

(54) WATER FILLING SYSTEM FOR REACTOR WATER LEVEL GAUGE

(71) Applicants: Fujio Shiraishi, Yokohama (JP); Hisayoshi Fukai, Yokohama (JP)

(72) Inventors: Fujio Shiraishi, Yokohama (JP); Hisayoshi Fukai, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 265 days.

(21) Appl. No.: 13/672,984

(22) Filed: Nov. 9, 2012

(65) Prior Publication Data
US 2013/0121450 A1 May 16, 2013

(30) Foreign Application Priority Data

Nov. 11, 2011 (JP) .................................. 2011-247957
Oct. 10, 2012 (JP) .................................. 2012-225201

(51) Int. Cl.
*G21C 17/035* (2006.01)
*G21C 17/00* (2006.01)
*G21C 15/18* (2006.01)
*G21C 17/02* (2006.01)

(52) U.S. Cl.
CPC .............. *G21C 17/00* (2013.01); *G21C 15/182* (2013.01); *G21C 17/02* (2013.01); *G21C 17/035* (2013.01); *Y02E 30/40* (2013.01)

(58) Field of Classification Search
CPC .... G21C 17/035; G21C 15/18; G21C 15/182; G21C 2015/18; G21C 2015/182; G21C 19/28
USPC .................... 376/245, 247, 258, 282; 73/302; 137/386
See application file for complete search history.

(56) References Cited

U.S. PATENT DOCUMENTS

| 4,302,288 | A | * | 11/1981 | Youngborg | 376/258 |
| 4,394,346 | A | * | 7/1983 | Morooka | 376/258 |
| 4,595,555 | A | * | 6/1986 | Orii | 376/282 |
| 4,643,025 | A | * | 2/1987 | Stone | 73/302 |
| 4,765,945 | A | * | 8/1988 | Walleser | 376/258 |
| 5,011,652 | A | * | 4/1991 | Tominaga et al. | 376/282 |
| 5,024,802 | A | * | 6/1991 | Srinivasan | 376/258 |
| 5,268,942 | A | * | 12/1993 | Newton et al. | 376/298 |
| 5,309,488 | A | * | 5/1994 | Matsuoka | 376/282 |
| 5,365,555 | A | * | 11/1994 | Sawabe et al. | 376/258 |
| 5,475,720 | A | * | 12/1995 | Oldenhage et al. | 376/258 |
| 5,566,571 | A | * | 10/1996 | Kasai et al. | 376/258 |
| 5,754,609 | A | * | 5/1998 | Meseth | 376/247 |
| 5,881,117 | A | * | 3/1999 | Matteson | 376/258 |

(Continued)

FOREIGN PATENT DOCUMENTS

JP 10-296006 A 11/1998

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A water filling system for a reactor water level gauge is provided for filling a reactor water level gauge instrumentation pipe in a reactor building with water and filling the reactor water level gauge with water even in an unexpected abnormal event where the reactor building is brought into a highly radioactive environment. The water filling system for a reactor water level gauge includes a water filling instrumentation pipe guided from the reactor water level gauge instrumentation pipe in the reactor building to an outside of the reactor building and filling the reactor water level gauge instrumentation pipe in the reactor building with water even in an unexpected abnormal event of a nuclear power plant.

14 Claims, 10 Drawing Sheets

(56) References Cited

U.S. PATENT DOCUMENTS

| | | | |
|---|---|---|---|
| 6,865,244 B2 * | 3/2005 | Meseth | 376/258 |
| 8,848,854 B2 * | 9/2014 | Jain et al. | 376/282 |
| 8,867,690 B2 * | 10/2014 | Watson et al. | 376/282 |
| 2008/0083276 A1 * | 4/2008 | Patel et al. | 376/247 |

* cited by examiner

WATER FILLING SYSTEM FOR REACTOR WATER LEVEL GAUGE

BACKGROUND OF THE INVENTION

1. Field of the Invention

The present invention relates to a water filling technique capable of filling a reactor water level gauge with water even in an unexpected abnormal event where a reactor building is brought into a highly radioactive environment.

2. Description of the Related Art

In a nuclear power plant, a reactor holds water, and hydraulic head pressure of water is measured to measure a reactor water level. An instrumentation pipe of a reactor water level gauge that measures a reactor water level is filled with water.

As shown in FIG. 11, such instrumentation pipe 1a of a reactor water level gauge 1 is connected via a gauge test valve 2 to a pump 3. The gauge test valve 2 is opened, and the pump 3 is used to fill the instrumentation pipe 1a of the reactor water level gauge 1 with water from a makeup water system (MUW) or water in a tank 4 left overnight in terms of preventing inflow of air.

In a reactor building 5, the makeup water system (MUW) is provided close to the instrumentation pipe 1a of the reactor water level gauge 1, and an MUW main valve 7a of the MUW pipe 7 and the gauge test valve 2 are connectable by a flexible pipe. The gauge test valve 2 is opened, and the MUW main valve 7a is opened to fill the instrumentation pipe 1a of the reactor water level gauge 1 with water, and a reactor water level can be measured by the reactor water level gauge 1.

However, due to an earthquake, in the reactor water level gauge 1, water in the instrumentation pipe 1a in a reactor containment vessel 6 evaporates to cause a malfunction or an instruction error of measuring gauges. In addition, after the earthquake, the reactor containment vessel 6 is brought into an environment of 100° C. or more, the water in the instrumentation pipe 1a continuously evaporates without being condensed to cause an instruction error for measurement of the reactor water level. In FIG. 11, reference numeral 8 denotes a reactor pressure vessel, and reference numeral 9 denotes an existing transmitter.

Further, the reactor building 5 housing gauges is brought into a highly radioactive environment after the earthquake, the gauge test valve 2 through which the instrumentation pipe 1a of the reactor water level gauge 1 is filled with water is not accessible, making it difficult to fill the instrumentation pipe 1a with water.

For a conventional nuclear power plant, occurrence of an unexpected abnormal event such as an earthquake is not considered, and further, it is not assumed that the reactor building 5 is brought into a highly radioactive environment. Thus, inaccessibility to the gauge test valve 2 provided in the reactor building 5 is not considered.

SUMMARY OF THE INVENTION

The present invention is achieved in view of the above described circumstances and has an object to provide a water filling system for a reactor water level gauge capable of filling the reactor water level gauge with water even in an unexpected abnormal event where a reactor building is brought into a highly radioactive environment.

The above and other objects can be achieved according to the embodiment of the present invention by providing a water filling system for a reactor water level gauge including: a reactor water level gauge instrumentation pipe disposed in a reactor building; and a water filling instrumentation pipe connected to the reactor water level gauge instrumentation pipe and extended outside the reactor building to fill the reactor water level gauge instrumentation pipe in the reactor building with water.

A separation valve to be opened or closed by a nitrogen gas from outside the reactor building may be provided for the water filling instrumentation pipe.

Furthermore, to achieve the objects of the present invention, an embodiment provides a water filling system for a reactor water level gauge including: a reactor water level gauge instrumentation pipe disposed in a reactor building; and a water filling instrumentation pipe guided from the reactor water level gauge instrumentation pipe to an outside of the reactor building, the water filling instrumentation pipe being connected to a makeup water instrumentation pipe connected to a make-up water (MUW) pipe outside the reactor building.

Furthermore, the objects of the present invention can be achieved by providing a water filling system for a reactor water level gauge including a water filling instrumentation pipe guided from a reactor water level gauge instrumentation pipe in a reactor building to an outside of the reactor building, the water filling instrumentation pipe being connected to an instrumentation pipe for instrumentation connected to a high pressure injection nitrogen gas supply pipe (HPIN) outside the reactor building for supplying nitrogen to open/close a separation valve provided in the water filling instrumentation pipe.

According to the embodiment of the present invention of the characters mentioned above, The present invention can provide a water filling system for a reactor water level gauge capable of filling the reactor water level gauge instrumentation pipe in the reactor building with water, and filling the reactor water level gauge with water, even if an unexpected abnormal event occurs where the reactor building is brought into a highly radioactive environment and is inaccessible.

DESCRIPTION OF THE PREFERRED EMBODIMENTS

Hereunder, embodiments of the present invention will be described with reference to the accompanying drawings.

First Embodiment

Figure 1:
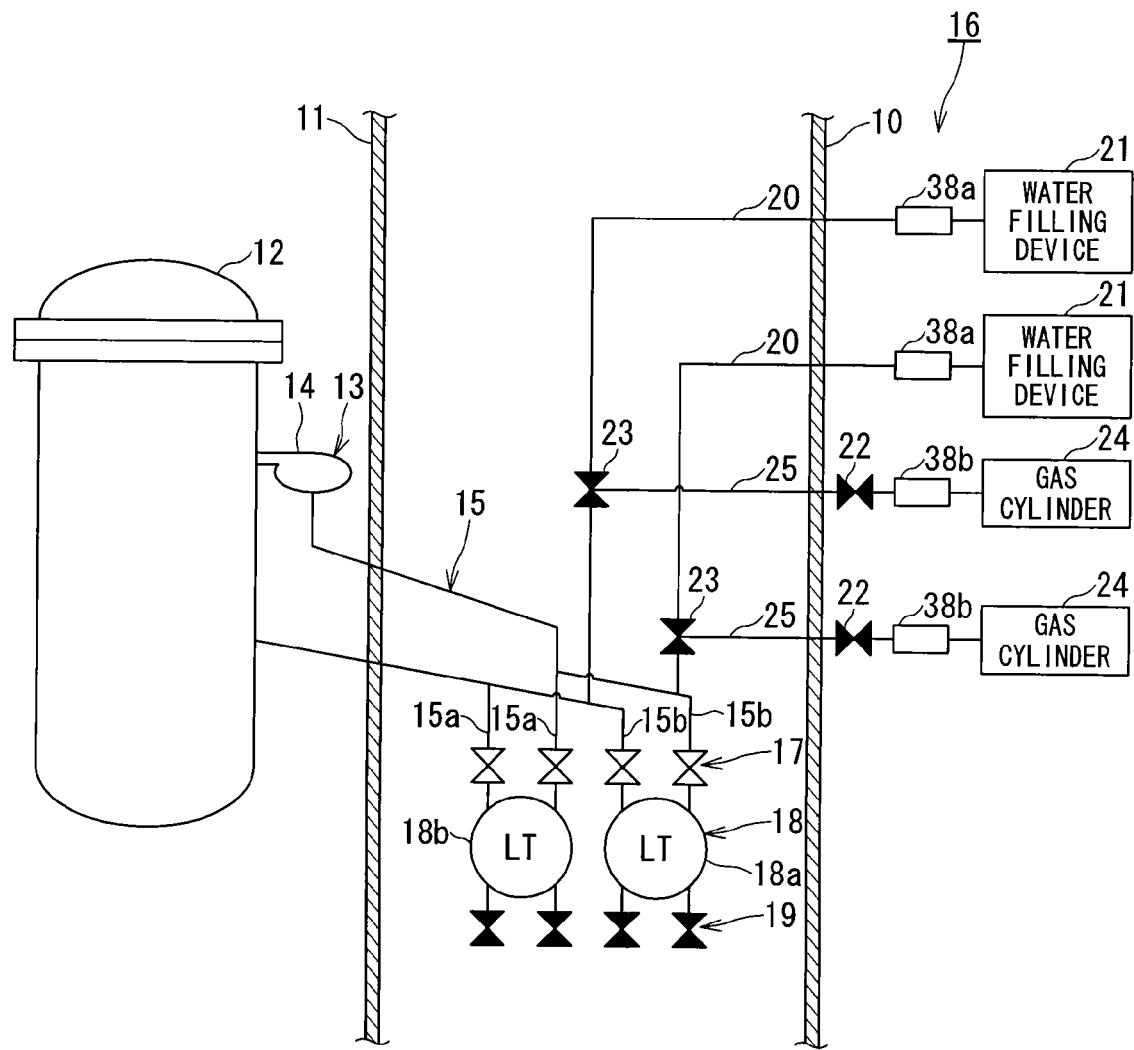
FIG. 1 is a configuration diagram of a water filling system for a reactor water level gauge according to a first embodiment.

FIG. 1 is a configuration diagram of a water filling system for a reactor water level gauge according to a first embodiment.

In a nuclear power plant, a reactor containment vessel 11 is provided in a reactor building 10, and houses a reactor pressure vessel 12. In the reactor containment vessel 11, a reactor water level gauge 13 that measures a water level in the reactor pressure vessel 12 is provided. The reactor water level gauge 13 includes a reactor water level gauge instrumentation pipes 15 in the reactor building, connected to two vertically upper and lower portions of the reactor pressure vessel 12. The two reactor water level gauge instrumentation pipes 15 in the reactor building are extended into the reactor building 10 through unshown penetration in the reactor containment vessel 11. Among two vertical connecting portions of the reactor pressure vessel 12, a condensation bath 14 can be provided on the upper connecting portion, and a plurality of, for example, four condensation baths 14 are provided outside the reactor pressure vessel 12.

Figure 10:
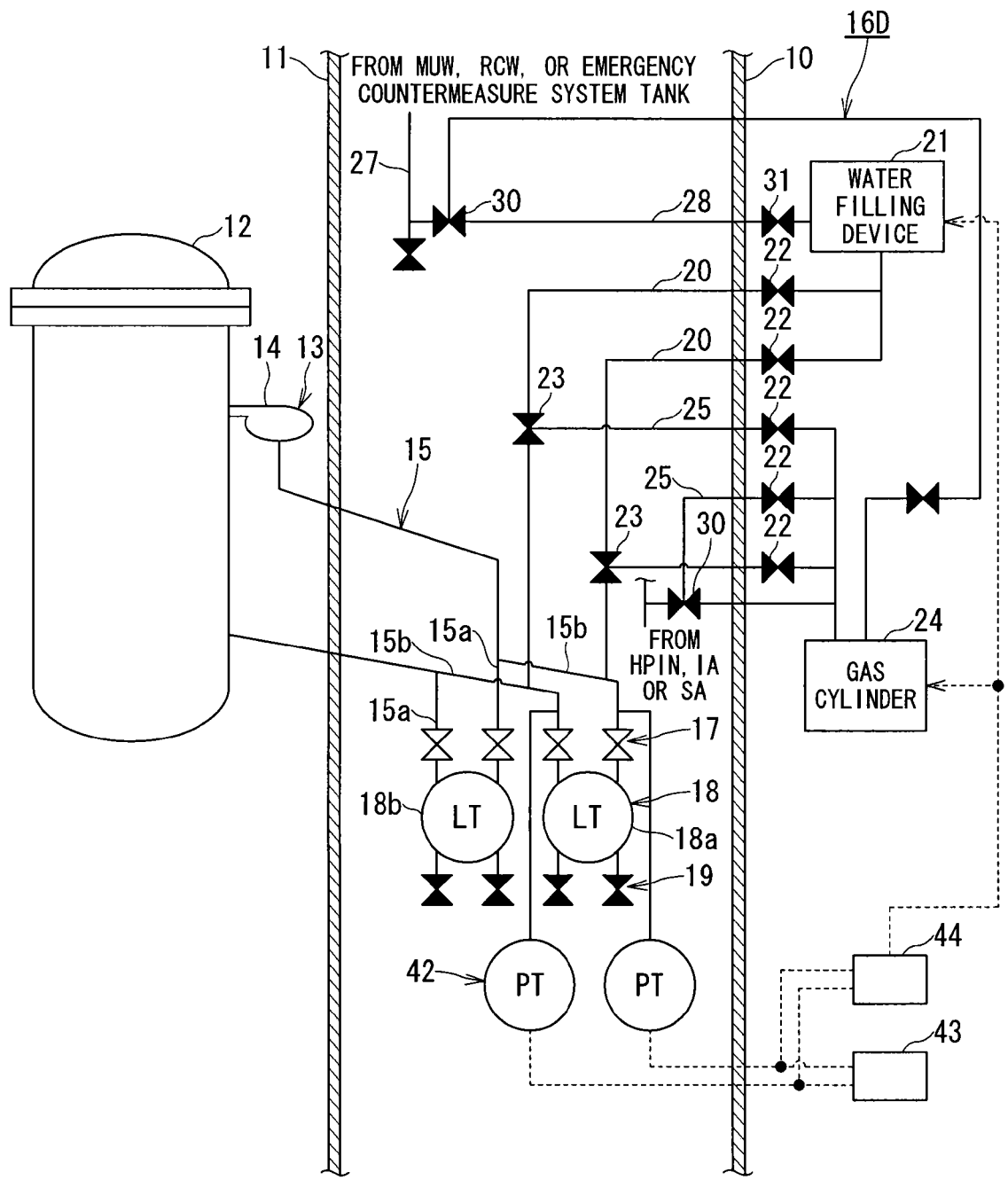
FIG. 10 is a configuration diagram of a water filling system for a reactor water level gauge according to a fifth embodiment.
Figure 11:
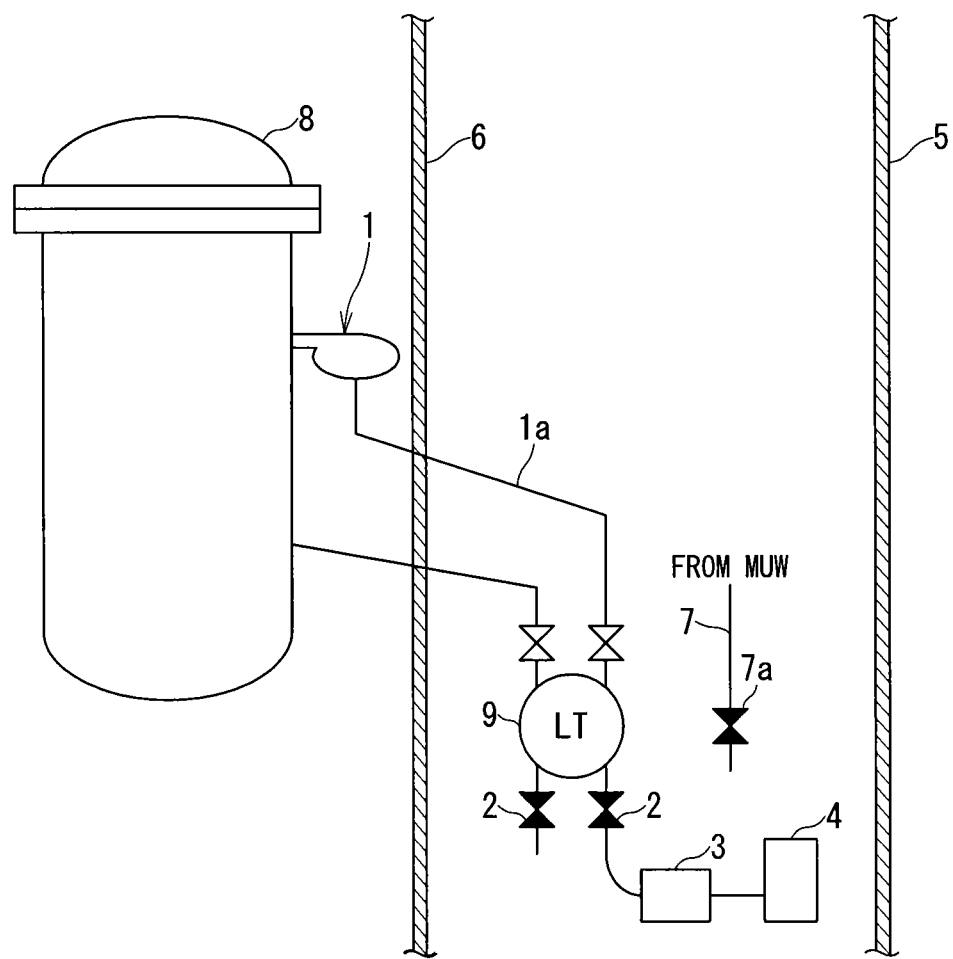
FIG. 11 is a configuration diagram showing a reactor water level gauge and a water filling system in a conventional nuclear power plant.

With a reactor, a water filling system 16 for a reactor water level gauge is configured, during normal operation, so that as shown in FIG. 10, the two upper and lower reactor water level gauge instrumentation pipes 15 in the reactor building are filled with water. One detecting instrumentation pipe 15a and the other detecting instrumentation pipe 15b branch off from each of the two reactor water level gauge instrumentation pipes 15 in the reactor building. One detecting instrumentation pipe 15a has the same configuration as an instrumentation pipe 1a of an existing reactor water level gauge 1 shown in FIG. 11, and the instrumentation pipes are provided, for example, on diametrically opposite outer sides of the reactor pressure vessel 12.

In the detecting instrumentation pipes 15a, 15b of the reactor water level gauge 13, transmitters 18 (level transmitters (LT) 18a, 18b, respectively) are provided via gauge inlet valves 17, and transmitters 18 (18a, 18b) paired therewith are provided, for example, on a diametrically opposite side of the reactor pressure vessel 12 in the reactor building 10. One of the pair of transmitters 18 is the same as an existing transmitter 18a (corresponding to reference numeral 9 in FIG. 11), and the other is a dedicated transmitter 18b used in an emergency.

A gauge test valve 19 is provided on an outlet side of the gauge inlet valve 17. The reactor water level gauge 13 includes the condensation bath 14, the reactor water level gauge instrumentation pipe 15 in the reactor building, the gauge inlet valve 17, the transmitter 18, and the gauge test valve 19. The reactor water level gauge 13 uses at least one of the transmitters 18a, 18b to measure a difference in water pressure between the two upper and lower reactor water level gauge instrumentation pipes 15 in the reactor building 10 to measure a water level of the reactor pressure vessel 12.

The reactor water level gauge instrumentation pipe 15 in the reactor building further includes a water filling instrumentation pipe 20. The water filling instrumentation pipe 20 has one end connected to the reactor water level gauge instrumentation pipe 15 in the existing reactor building, and the other end guided so as to extend to an outside of the reactor building 10 such as outdoors, and includes a joint 38a. The joint 38a connects a water filling device 21.

Further, a separation valve 23 is provided in a middle of the water filling instrumentation pipe 20. Each separation valve 23 separates the reactor water level gauge instrumentation pipe 15 in the reactor building and the reactor building 10 from outside. The separation valve 23 is connected by an operating instrumentation pipe 25. The operating instrumentation pipe 25 has one end connected to the separation valve 23, and the other end extended outside the reactor building 10 and including a joint 38b via a stop valve 22. A gas cylinder 24 can be connected to the joint 38b.

There will be described an operation of the water filling system 16 for a reactor water level gauge of the structure described above, in an emergency, when an operator should evacuate to the outside of the reactor building 10.

In an emergency, the water filling device 21 is connected to the joint 38a, and the gas cylinder 24 is connected to the joint 38b. A nitrogen gas ($N_2$) or air is supplied by the gas cylinder 24 to open the stop valve 22 and open the separation valve 23. Then, the water filling device 21 is used to supply water to the detecting instrumentation pipe 15b to fill the reactor water level gauge instrumentation pipe 15 in the reactor building with water.

First Modification of First Embodiment

Figure 2:
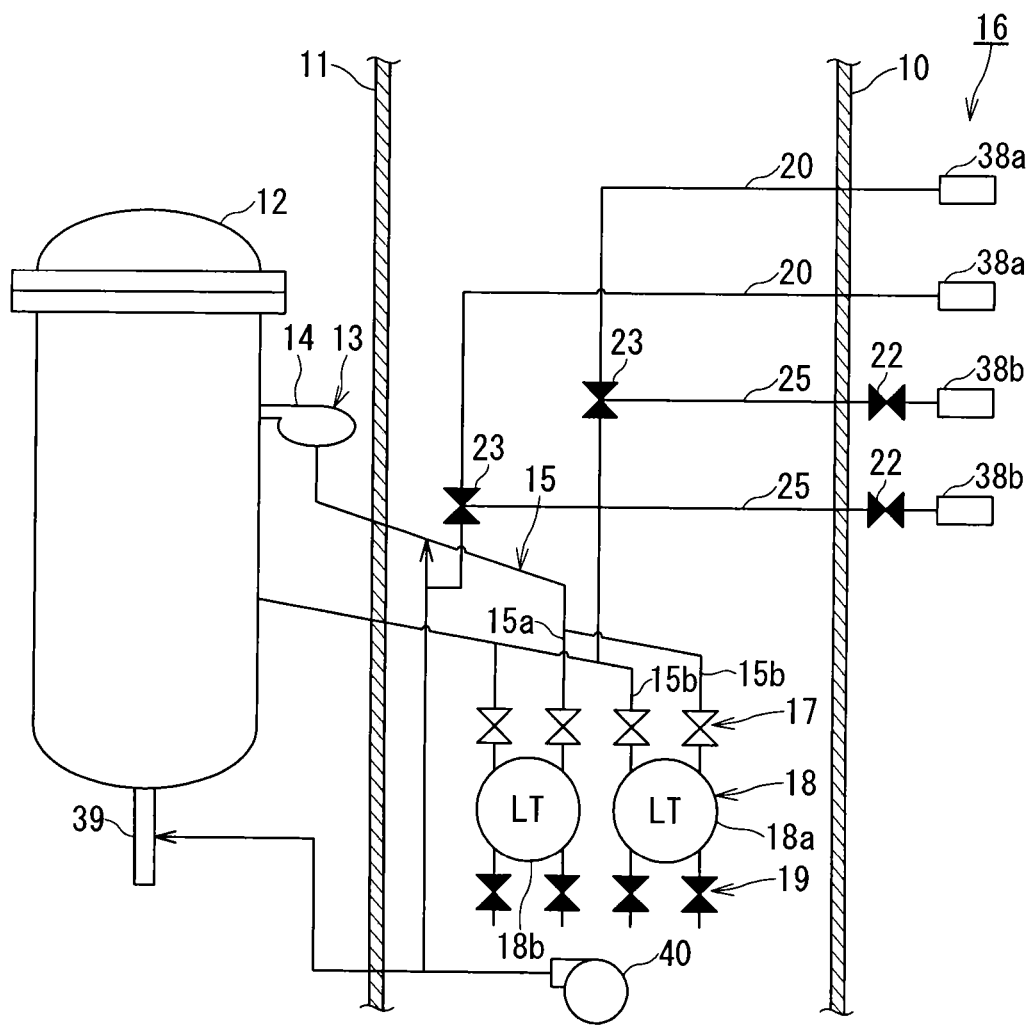
FIG. 2 is a configuration diagram representing the water filling system for a reactor water level gauge according to a first modification of the first embodiment.

FIG. 2 shows a first modification (modified embodiment) of the first embodiment.

The first modification is such that a CRD pump (control rod drive mechanism) 40 is used to supply water to the reactor water level gauge instrumentation pipe 15 in the reactor building in the first embodiment of the water filling system 16 for a reactor water level gauge. As shown in FIG. 2, during operation of the plant, the CRD pump 40 supplies water to a CRD 39, and the CRD 39 supplies water to the reactor water level gauge instrumentation pipe 15. Since it cannot be expected that the CRD pump 40 operates at a time of an accident, if the reactor water level gauge instrumentation pipe 15 needs to be filled with water at the time of an accident, the water filling system 16 for the reactor water level gauge 13 uses the water filling instrumentation pipe 20 from the water filling device 21. Thus, the gas cylinder 24 is connected to open the separation valve 23, and the water filling device 21 is used to fill the reactor water level gauge instrumentation pipe 15 with water. The water filling procedure is the same as that represented in FIG. 1, and thus, detail there omitted herein.

Second Modification of First Embodiment

Figure 3:
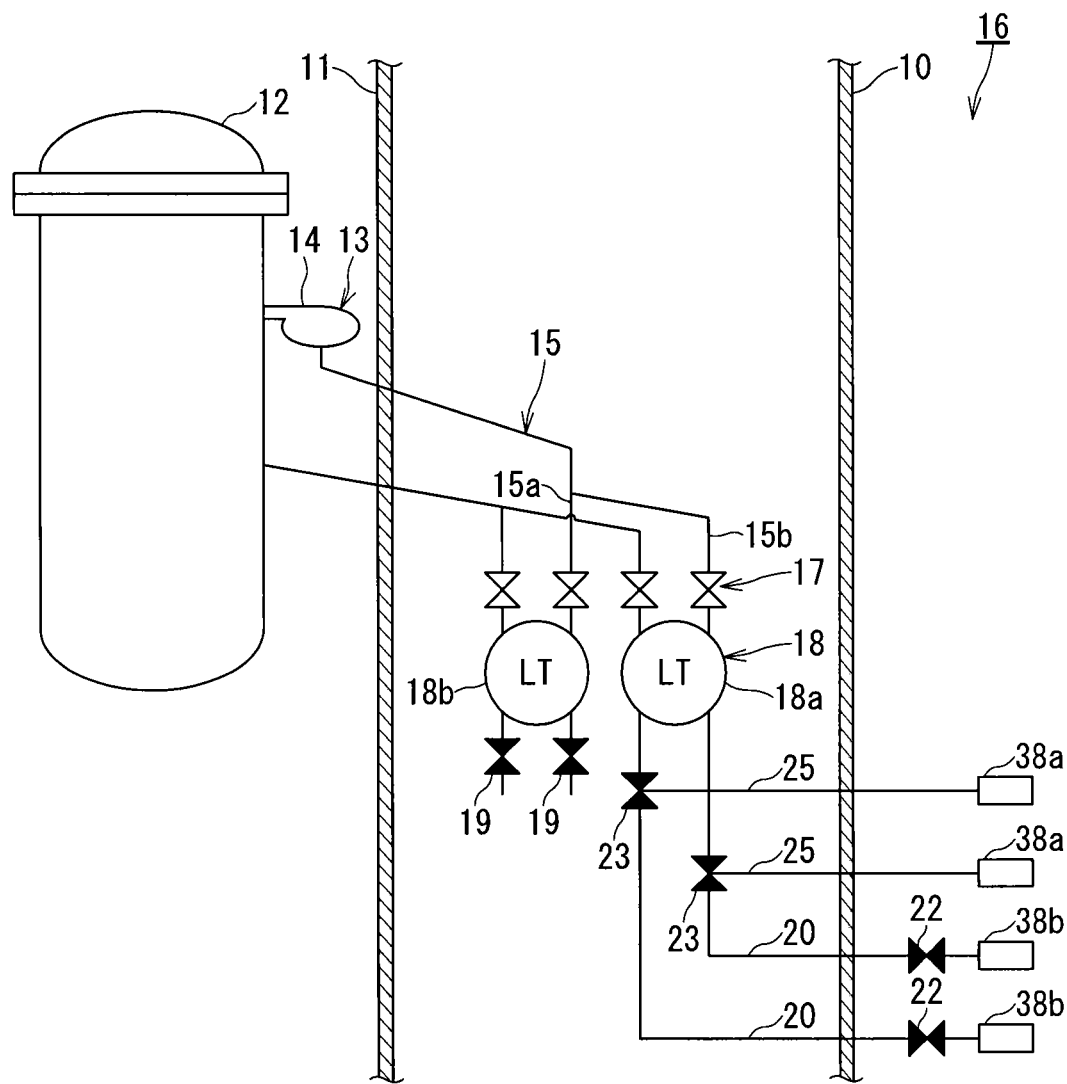
FIG. 3 is a configuration diagram representing a second of the first embodiment.

FIG. 3 shows a second modification (modified embodiment) of the first embodiment of the water filling system for a reactor water level gauge.

The second modification has a structure in which the gauge test valve 19 is replaced by a separation valve 23. The separation valve 23 is provided below the transmitter 18a instead of the gauge test valve 19. The water filling instrumentation pipe 20 is extended from the separation valve 23 to an outside of the reactor building 10, and the water filling device 21 can be connected via a joint 38a outside the reactor building 10. Further, the separation valve 23 can be operated from outside the reactor building 10 by the water filling instrumentation pipe 20 and the gas cylinder 24. The water filling procedure is the same as in FIG. 1, and thus, detail will be omitted herein.

This case has characteristic feature such that the number of gauge test valves 19 is smaller than in the first embodiment.

Second Embodiment

Figure 4:
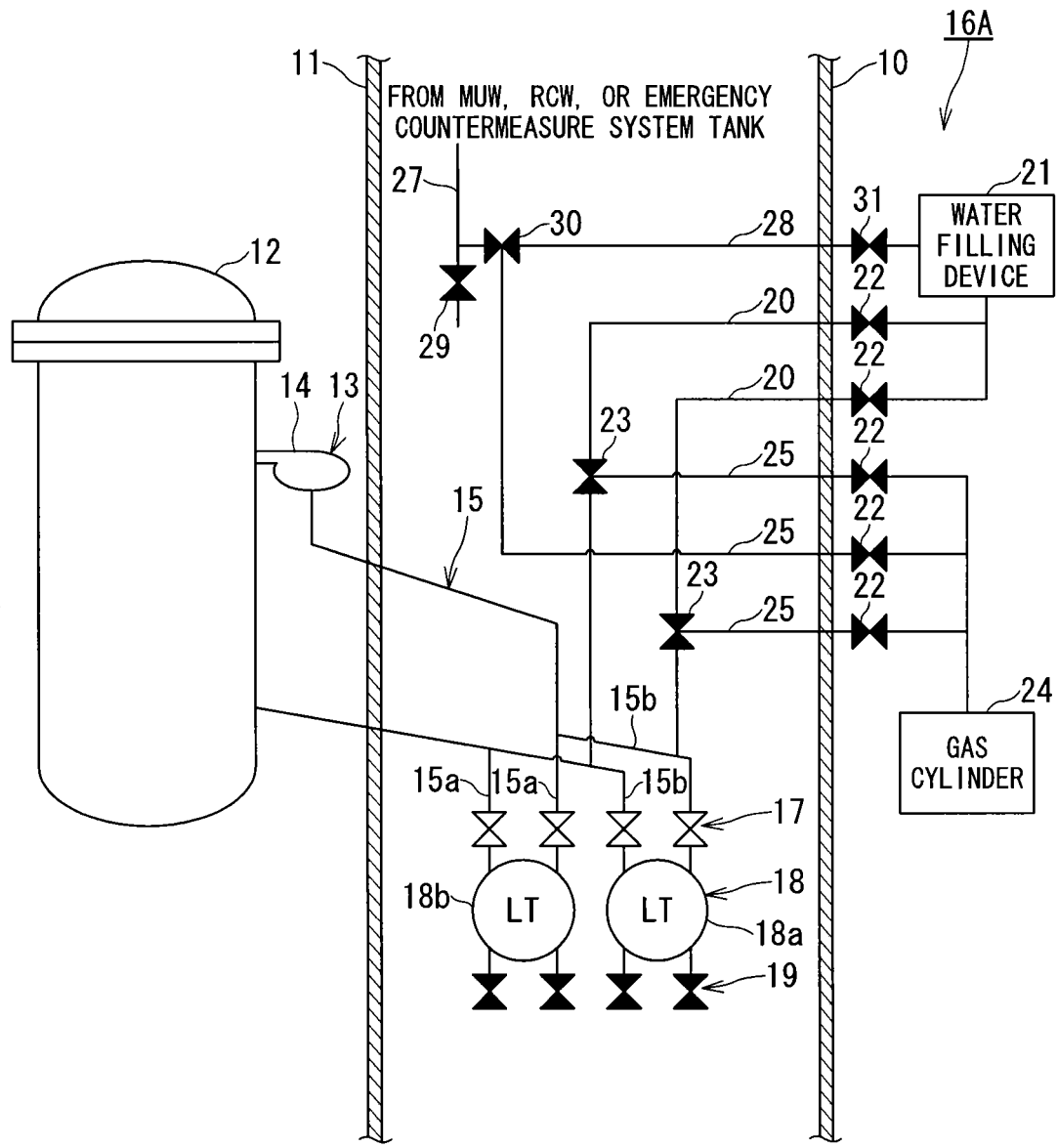
FIG. 4 is a configuration diagram of a water filling system for a reactor water level gauge according to a second embodiment.

FIG. 4 is a configuration diagram representing a water filling system for a reactor water level gauge according to a second embodiment.

A water filling instrumentation pipe 20 in a water filling system 16A for a reactor water level gauge 13 is guided from a detecting instrumentation pipe 15b of a reactor water level gauge instrumentation pipe 15 in an existing reactor building to an outside of a reactor building 10 such as outdoors and connected to a water filling device 21. The water filling instrumentation pipe 20 includes a normally-closed stop valve 22 outside the reactor building 10 and a separation valve 23 in the reactor building 10. The separation valve 23 and the stop valve 22 are dual valves because high pressure is applied on the valves.

The separation valve 23 provided in the water filling instrumentation pipe 20 is a normally-closed AO valve, and the separation valve 23 is connected to a gas cylinder 24 provided outside the reactor building 10 such as outdoors via an operating instrumentation pipe 25. The separation valve 23 is configured to be opened by a nitrogen gas ($N_2$) or air supplied via the stop valve 22 by the gas cylinder 24 provided outside the reactor building 10.

Meanwhile, in the reactor building 10, a makeup water pipe 27 is placed connecting to an MUW (makeup water system) that supplies water, a reactor building closed cooling water system (RCW), or an emergency countermeasure system tank. A makeup water instrumentation pipe 28 branches off from the makeup water pipe 27 and is guided outside the reactor building 10, and connected to the water filling device 21 outside the reactor building 10. Further, in FIG. 4, reference numeral 29 denotes an MUW valve.

The makeup water instrumentation pipe 28 connected to the makeup water pipe 27 includes a separation valve 30 in the reactor building 10 and a normally-closed stop valve 31 outside the reactor building 10. The separation valve 30 of the makeup water instrumentation pipe 28 branching off from the makeup water pipe 27 is a normally-closed AO valve, connected by the operating instrumentation pipe 25 to the gas cylinder 24 provided outside the reactor building 10 such as outdoors, and opened by a nitrogen gas ($N_2$) or air from the gas cylinder 24. The separation valve 30 can be opened to supply water from the MUW (makeup water system) into the water filling device 21.

Figure 5:
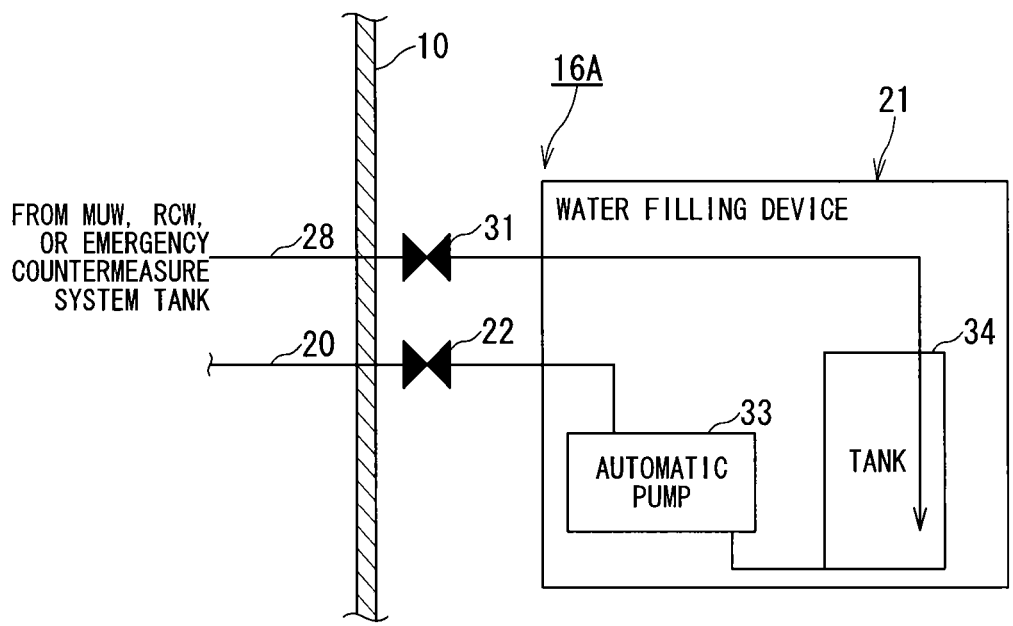
FIG. 5 shows a water filling device included in the water filling system for a reactor water level gauge.

As shown in FIG. 5, the water filling device 21 provided outside the reactor building 10 such as outdoors includes a hand pump or an automatic pump 33 and a tank 34, and water from the MUW is supplied to the tank 34. The water from the MUW to the reactor water level gauge 13 or water left overnight in terms of preventing inflow of air is supplied to the tank 34.

The water filling system 16A for a reactor water level gauge is configured so that the water filling device 21 provided outside the reactor building 10 such as outdoors can be used to supply water in the tank 34 through the water filling instrumentation pipe 20 to the reactor water level gauge instrumentation pipe 15 in the reactor building.

Figure 6:
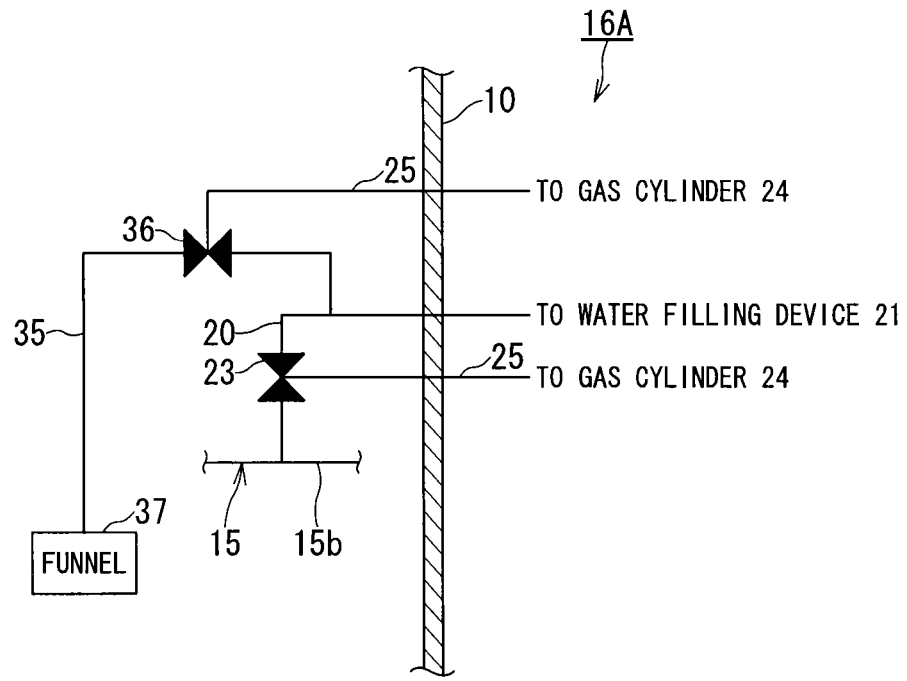
FIG. 6 shows an air vent device included in the water filling system for a reactor water level gauge.
Figure 7:
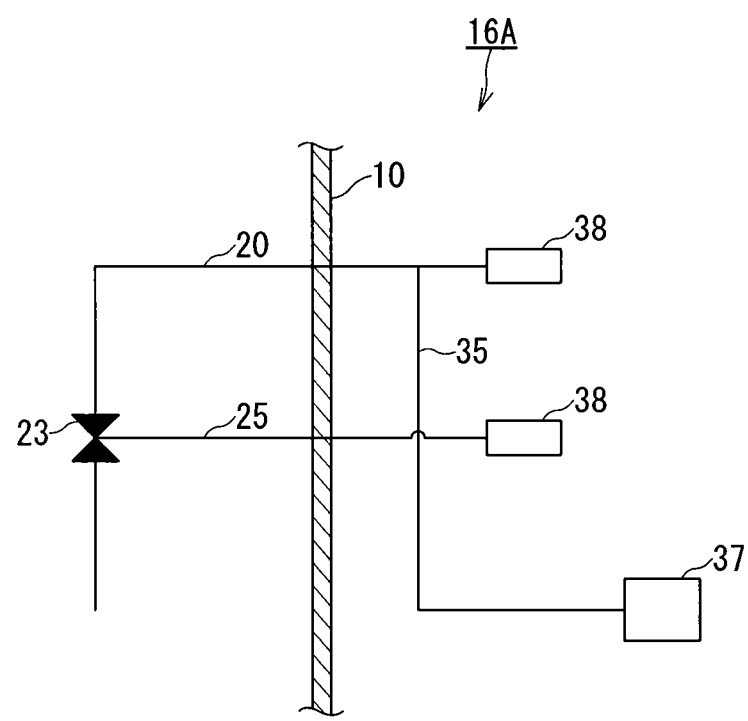
FIG. 7 shows the air vent device included in the water filling system for a reactor water level gauge.

Further, as shown in FIGS. 6 and 7, an air vent line 35 is provided upstream of the separation valve 23 in the water filling instrumentation pipe 20 as a water filling line. An air vent valve 36 as a normally-closed AO valve is provided in the air vent line 35 in FIG. 6 and connected to a funnel 37.

The air vent valve 36 can be opened/closed by $N_2$ (nitrogen gas) or air from the gas cylinder 24 provided outside the reactor building 10 such as outdoors. Before the reactor water level gauge instrumentation pipe 15 in the reactor building 10 is filled with water, the air vent valve 36 is opened with the water filling instrumentation pipe 20 being closed by the separation valve 23 so as to guide air contained in the water filling instrumentation pipe 20 to the funnel 37.

In the water filling system 16A for a reactor water level gauge of this second embodiment, even if an unexpected abnormal event occurs where the reactor building 10 is brought into a highly radioactive environment and is inaccessible, the separation valves 23, 23 in the water filling instrumentation pipe 20, the separation valve 30 in the instrumentation pipe 28 connected to the makeup water pipe 27 shown in FIG. 4, and further the normally-closed AO valve such as the air vent valve 36 in the air vent line 35 shown in FIG. 6 can be opened by a nitrogen gas ($N_2$) or air from the gas cylinder 24.

Further, since the normally-closed AO valve can be opened by a nitrogen gas ($N_2$) or air from the gas cylinder 24 even if power is shut down, the water filling device 21 provided outside the reactor building 10 such as outdoors can be used to fill the reactor water level gauge instrumentation pipe 15 in the reactor building 10 with water. Thus, the reactor water level gauge 13 can be filled with water. Even in an unexpected abnormal event where the reactor building 10 is brought into a highly radioactive environment and is inaccessible, and a reactor water level in the reactor pressure vessel 12 is reduced, the reactor water level or the like can be measured.

As shown in FIG. 4, in the water filling system 16A for a reactor water level gauge of this embodiment, for example, an existing transmitter 18a and an added transmitter 18b for a severe accident are provided in pair in the reactor building 10 of the existing nuclear power plant, and the water filling instrumentation pipe 20 and the normally-closed separation valves 23, 23, 30 provided in the reactor building 10, and the air vent valve 36 shown in FIG. 6 are opened by a nitrogen gas ($N_2$) or air pressure from the gas cylinder 24 even if power is shut down. Even if the reactor building 10 is brought into a highly radioactive environment and inaccessible, the reactor water level gauge instrumentation pipe 15 in the reactor building 10 can be independently filled with water. Thus, in an unexpected abnormal event, the transmitter 18b for a severe accident can be used with a minimum influence on the existing transmitter 18a, and the water filling instrumentation pipe 20 and the transmitter 18 can be independently operated when power is shut down.

Third Embodiment

Figure 8:
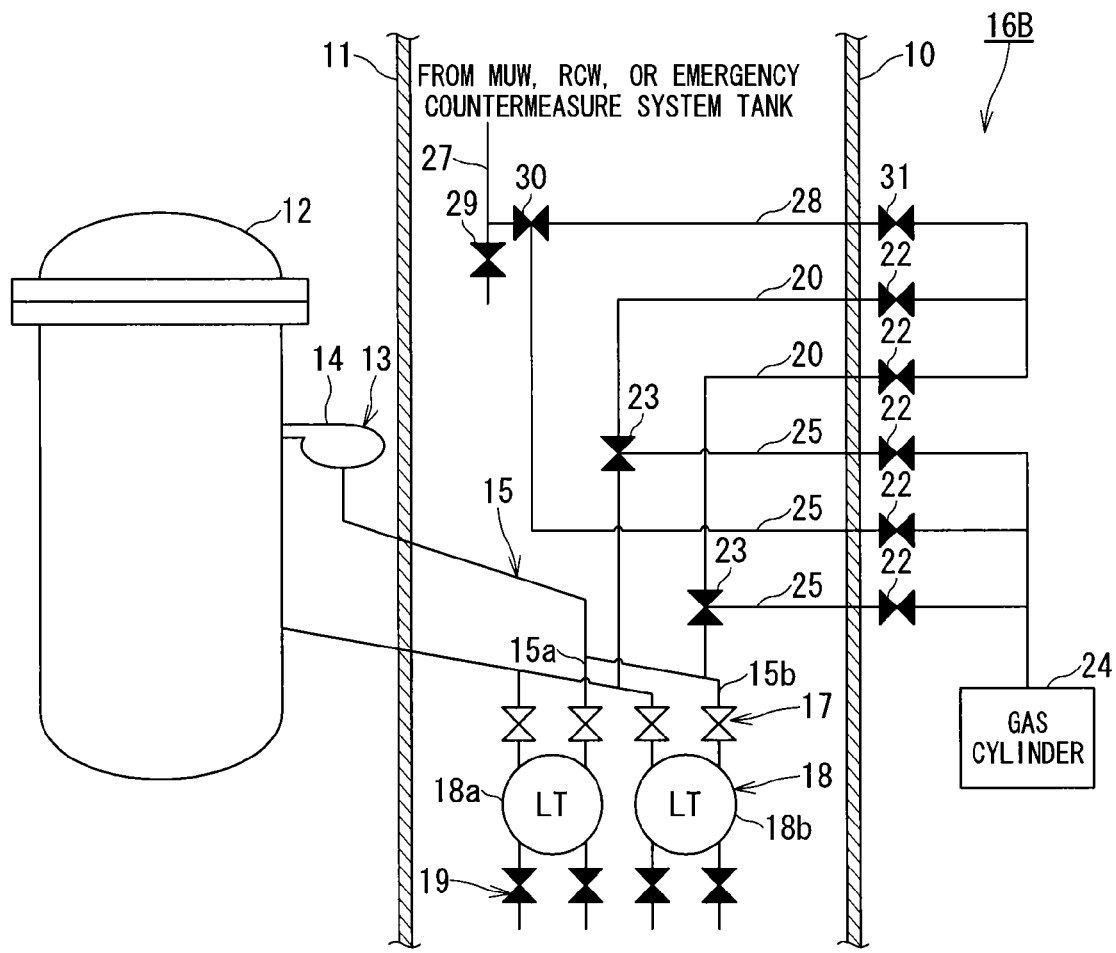
FIG. 8 is a configuration diagram of a water filling system for a reactor water level gauge according to a third embodiment.

FIG. 8 shows a third embodiment of a water filling system for a reactor water level gauge.

The water filling system 16B for a reactor water level gauge is basically different from the water filling system 16A for a reactor water level gauge in the second embodiment in a structure including no water filling device 21 outside the reactor building 10 such as outdoors. Other configurations are substantially the same as those in the second embodiment, and thus, the same components are denoted by the same reference numerals and overlapping descriptions will be omitted.

The water filling system 16B for a reactor water level gauge of this third embodiment has a configuration in which internal pressure of an MUW or an RCW that supplies water can be used to fill a reactor water level gauge instrumentation pipe 15 in a reactor building with water. The water filling system 16B for a reactor water level gauge 13 is configured so that a makeup water instrumentation pipe 28 branching off from a makeup water pipe 27 is guided outside the reactor building 10, and the makeup water instrumentation pipe 28 is connected to a water filling instrumentation pipe 20 outside the reactor building 10.

In the third embodiment, there is no need for a water filling device, and there is no need for an automatic pump or a manual pump 33 of the water filling device 21. The internal pressure of the MUW or the RCW can be used to fill the reactor water level gauge instrumentation pipe 15 in the reactor building with water, and thus, it is not necessary to locate a pump in the water filling system 16B for a reactor water level gauge, and there is also no need for a power supply required for an automatic pump in the water filling device 21 (FIG. 1), and there is no need to use a manual pump.

According to the water filling system 16B for a reactor water level gauge in FIG. 8, the instrumentation pipe 28 connected to the makeup water pipe 27 and the water filling instrumentation pipe 20 are connected outside the reactor building 10 such as outdoors, and thus, the makeup water from the MUW, the RCW, or an emergency countermeasure system tank can be used from outside the reactor building 10 to fill the reactor water level gauge instrumentation pipe 15 in the reactor building with water through the water filling instrumentation pipe 20.

The water filling system 16B for the reactor water level gauge 13 can include, in addition to an existing transmitter 18a, the makeup water instrumentation pipe 28 connected to the MUW pipe 27, the water filling instrumentation pipe 20, and a dedicated transmitter 18b for a severe accident used in an earthquake can be independently provided in the reactor building 10. Thus, even in an unexpected abnormal event where the reactor building 10 is brought into a highly radioactive environment and is inaccessible, a nitrogen gas ($N_2$) or air from the gas cylinder 24 provided outside the reactor building 10 such as outdoors can be used to open a normally-closed separation valve 30 or an air vent valve 36 (see FIGS. 6 and 7) to fill the reactor water level gauge instrumentation pipe 15 in the reactor building with water. Thus, the reactor water level gauge 13 can be filled with water, the reactor water level can be measured, and even in an unexpected abnormal event, the water filling instrumentation pipe 20 and the transmitter 18 can be independently operated.

Fourth Embodiment

Figure 9:
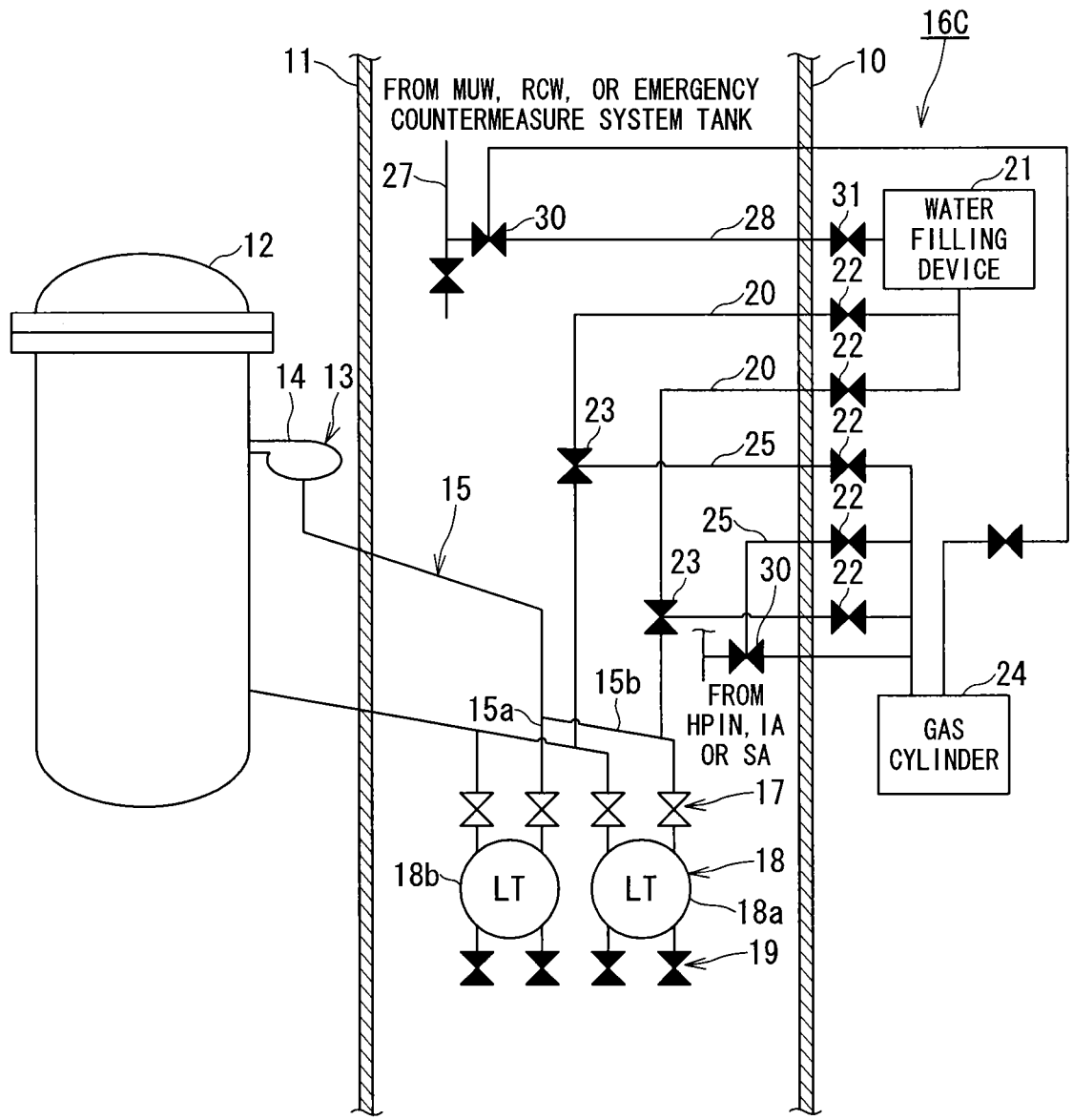
FIG. 9 is a configuration diagram of a water filling system for a reactor water level gauge according to a fourth embodiment.

FIG. 9 shows a fourth embodiment of a water filling system for a reactor water level gauge.

The water filling system 16C for a reactor water level gauge is different from the water filling system 16A for a reactor water level gauge in the second embodiment in a structure in which nitrogen or air for opening/closing a separation valve can be supplied by a high pressure injection nitrogen gas supply system (HPIN) or a compression air system (IA). Other configurations are substantially the same as those in the second embodiment, and thus, the same components are denoted by the same reference numerals and overlapping descriptions will be omitted.

The water filling system 16C for a reactor water level gauge of this fourth embodiment can be newly provided in a nuclear power plant, but it may be conceivable that an instrumentation pipe 20, an MUW pipe 27, and an existing transmitter 18a in an reactor building 10 provided in an existing nuclear power plant can be used to additionally constitute the water filling system 16C for a reactor water level gauge 13.

The latter water filling system 16C for a reactor water level gauge is configured by adding, in the reactor building 10, a water filling instrumentation pipe 20, an instrumentation pipe 28 connected to the MUW pipe 27, and a dedicated transmitter 18b for a severe accident used in an earthquake, and providing, outside the reactor building 10, a tank for supplying a nitrogen gas ($N_2$) or air or a water filling device 21, in an existing nuclear power plant.

Fifth Embodiment

FIG. 10 shows a fifth embodiment of a water filling system for a reactor water level gauge.

The water filling system 16D for a reactor water level gauge is different from the water filling system 16B for a reactor water level gauge in the third embodiment in a structure for monitoring pressure in a reactor water level gauge instrumentation pipe 15 in a reactor building 10. Other configurations are substantially the same as those in the third embodiment, and thus, the same components are denoted by the same reference numerals and overlapping descriptions will be omitted herein.

The water filling system 16D for a reactor water level gauge of this fifth embodiment has a feature in which a transmitter (i.e., pressure transmitter (PT)) 42 detects pressure in a reactor water level gauge instrumentation pipe 15 in a reactor building 10. The transmitter 42 detects reactor pressure and hydraulic head pressure of the reactor water level gauge instrumentation pipe 15 in the reactor building 10 and can check a water draining state and effectiveness of water filling in the reactor water level gauge instrumentation pipe 15 in the reactor building.

An instruction from the transmitter 42 can be monitored by an instruction unit 43 provided outside the reactor building 10 such as outdoors. The instruction from the transmitter 42 is monitored by the instruction unit 43 to thereby check or control the effectiveness of water filling from outside the reactor building 10 such as outdoors while water is being filled.

The instruction from the transmitter 42 can be output to a control device 44 provided outside the reactor building 10 such as outdoors, a pressure or a change in pressure of the reactor water level gauge instrumentation pipe 15 in the reactor building is used to check that a condensation bath 14 of a reactor water level gauge 13 has been filled with water, and an operation of the pump 33 in the water filling device 21 can be stopped or the separation valve 23 can be opened/closed to control filling of the reactor water level gauge instrumentation pipe 15 with water. Thus, the reactor water level gauge 13 can be automatically filled with water.

It is further to be noted that the first to fifth embodiments of the present invention described above may be appropriately combined.

What is claimed is:

1. A water filling system for a nuclear reactor water level gauge comprising:
   a reactor water level gauge instrumentation pipe connected to two vertically upper and lower portions of a nuclear reactor pressure vessel;
   a water filling instrumentation pipe connected to the reactor water level gauge instrumentation pipe at an inside of a reactor building and extended outside the reactor building, the water filling instrumentation pipe supplying water to the reactor water level gauge instrumentation pipe; and
   a water filling device provided outside the reactor building, the water filling device connected to the water filling instrumentation pipe, the water filling device injecting the water into the water filling instrumentation pipe and filling the reactor water level gauge instrumentation pipe with the water.

2. The water filling system for a nuclear reactor water level gauge according to claim 1, further comprising:
   a first separation valve provided in the water filling instrumentation pipe, the first separation valve being opened when a nitrogen gas or air is injected;
   a first operating instrumentation pipe connected to the first separation valve and extended outside the reactor building, the first operating instrumentation pipe flowing the nitrogen gas or the air; and
   a gas cylinder provided outside of the reactor building, the gas cylinder connected to the first operating instrumentation pipe, the gas cylinder supplying the nitrogen gas or the air to the first separation valve through the first operating instrumentation pipe.

3. The water filling system for a nuclear reactor water level gauge according to claim 2, further comprising a stop valve provided between the first separation valve and a joint detachably connecting the gas cylinder that operates the first separation valve, wherein when the stop valve is closed, an internal pressure of the first operating instrumentation pipe is maintained and the first separation valve is maintained in an opened state thereof.

4. The water filling system for a nuclear reactor water level gauge according to claim 3, wherein the water filling instrumentation pipe includes the stop valve outside the reactor building, and the first separation valve is adjacent close to the reactor water level gauge instrumentation pipe in the reactor building.

5. The water filling system for a nuclear reactor water level gauge according to claim 1, the water filling device having:
   a tank connected to a makeup water instrumentation pipe connecting to any one of a make-up water (MUW) pipe, a reactor cooling water (RCW) pipe, and an emergency countermeasure system tank, the makeup water instrumentation pipe flowing the water; and
   a pump supplying the water filled in the tank to the reactor water level gauge instrumentation pipe through the water filling instrumentation pipe.

6. The water filling system for a nuclear reactor water level gauge according to claim 5, further comprising:
   a second separation valve provided in the makeup water instrumentation pipe at the inside of the reactor building;
   a stop valve provided in the makeup water instrumentation pipe at the outside of the reactor building; and
   a second operating instrumentation pipe connected to the second separation valve and extended outside the reactor building, another side of the second operating instrumentation pipe connected to a gas cylinder,
   wherein the gas cylinder supplies nitrogen gas or air to the second separation valve through the second operating instrumentation pipe.

7. The water filling system for a nuclear reactor water level gauge according to claim 5, wherein the makeup water instrumentation pipe and the tank in the water filling device are connected at the outside of the reactor building, and water is supplied to the water filling device through the makeup water instrumentation pipe.

8. The water filling system for a nuclear reactor water level gauge according to claim 1, further comprising:
   an air vent line connected to the water filling instrumentation pipe on an upstream side of a first separation valve,
   an air vent valve provided in the air vent line, the air vent valve being is opened with the first separation valve being closed, and
   a funnel absorbing air contained in the water filling instrumentation pipe, and the air is guided through the air vent line.

9. A water filling system for a nuclear reactor water level gauge comprising:
   a reactor water level gauge instrumentation pipe connected to two vertically upper and lower portions of a nuclear reactor pressure vessel;
   a water filling instrumentation pipe connected to the reactor water level gauge instrumentation pipe inside a reactor building and extended outside the reactor building, the water filling instrumentation pipe supplying water to the reactor water level gauge instrumentation pipe; and
   a makeup water instrumentation pipe connected to a make-up water (MUW) pipe and extended outside the reactor building, another side of the makeup water instrumentation pipe connected to the water filling instrumentation pipe at the outside of the reactor building.

10. The water filling system for a nuclear reactor water level gauge according to claim 9, further comprising:
    a first separation valve provided in the water filling instrumentation pipe, the first separation valve being opened when a nitrogen gas or air is injected;
    a second separation valve provided in the makeup water instrumentation pipe, the second separation valve being opened when the nitrogen gas or the air is injected;
    a first operating instrumentation pipe connected to the first separation valve and extended outside the reactor building, the first operating instrumentation pipe flowing the nitrogen gas or the air;
    a second operating instrumentation pipe connected to the second separation valve and extended outside the reactor building, the second operating instrumentation pipe flowing the nitrogen gas or the air; and
    a gas cylinder provided outside of the reactor building, the gas cylinder connected to the first operating instrumentation pipe and the second operating instrumentation pipe, the gas cylinder supplying the nitrogen gas or the air to the first separation valve and the second separation valve.

11. The water filling system for a nuclear reactor water level gauge according to claim 9, wherein the water filling instrumentation pipe and the makeup water instrumentation pipe are provided partially in the reactor building and are connected to each other at the outside of the reactor building.

12. The water filling system for a nuclear reactor water level gauge according to claim 9, further comprising:
    a third separation valve provide at the inside of the reactor building, the third separation valve being opened/closed by internal pressure of a high pressure injection nitrogen gas supply system (HPIN), by internal pressure of a compression instrument air (IA) system, or by internal pressure of a station air (SA) system.

13. The water filling system for a nuclear reactor water level gauge according to claim 12, further comprising:
    a transmitter measuring a pressure in the reactor water level gauge instrumentation pipe, and monitoring a hydraulic head pressure of the reactor water level gauge instrumentation pipe.

14. The water filling system for a nuclear reactor water level gauge according to claim 13, further comprising:
    a control device configured to receive the pressure and the hydraulic head pressure of the reactor water level gauge from the transmitter, and to fill a condensation bath of the reactor water level gauge with the water based on the pressure and the hydraulic head pressure.

\* \* \* \* \*